United States Patent
Lee (10) Patent No.: US 9,810,140 B2
(45) Date of Patent: Nov. 7, 2017

(54) COMBUSTION CHAMBER OF DIRECT INJECTION DIESEL ENGINE HAVING INDUCERS

(71) Applicant: Doosan Infracore Co., Ltd., Incheon (KR)

(72) Inventor: Jong Yoon Lee, Seoul (KR)

(73) Assignee: Doosan Infracore Co., Ltd., Incheon (KR)

( * ) Notice: Subject to any disclaimer, the term of this patent is extended or adjusted under 35 U.S.C. 154(b) by 0 days.

(21) Appl. No.: 14/439,943

(22) PCT Filed: Oct. 30, 2013

(86) PCT No.: PCT/KR2013/009708
§ 371 (c)(1),
(2) Date: Apr. 30, 2015

(87) PCT Pub. No.: WO2014/069886
PCT Pub. Date: May 8, 2014

(65) Prior Publication Data
US 2015/0308327 A1    Oct. 29, 2015

(30) Foreign Application Priority Data
Oct. 30, 2012 (KR) .................. 10-2012-0121155

(51) Int. Cl.
*F02B 23/00* (2006.01)
*F02B 23/06* (2006.01)
*F02B 3/06* (2006.01)

(52) U.S. Cl.
CPC ...... *F02B 23/0696* (2013.01); *F02B 23/0621* (2013.01); *F02B 23/0624* (2013.01);
(Continued)

(58) Field of Classification Search
CPC .............. F02B 23/0651; F02B 23/0696; F02B 23/0648; F02B 23/0663; F02B 23/0621;
(Continued)

(56) References Cited

U.S. PATENT DOCUMENTS 2,766,738 A * 10/1956 Hoffmann ............... F02B 19/14
                                              123/269
7,721,704 B2 * 5/2010 Lehmann .................. F02F 3/28
                                              123/307

(Continued)

FOREIGN PATENT DOCUMENTS

| JP | H108965 A | 1/1998 |
| JP | H1182026 A | 3/1999 |
| JP | 2006022781 A | 1/2006 |

OTHER PUBLICATIONS

International Search Report with English Translation from the Korean Intellectual Property Office dated Feb. 6, 2014 for corresponding International Application No. PCT/KR2013/009708, 5 pages.

*Primary Examiner* — Marguerite McMahon
(74) *Attorney, Agent, or Firm* — John D. Veldhuis-Kroeze; Westman, Champlin & Koehler, P.A.

(57) ABSTRACT

The present disclosure relates to a combustion chamber of a diesel engine, which has a recessed combustion bowl to mix fuel injected from an injector with air, the combustion chamber including: a cylinder head which has the injector mounted thereto and is positioned at an upper side of the combustion bowl; a cylinder block which is positioned at a lower side of the cylinder head; and a piston which moves upward and downward in the cylinder block and faces the cylinder head, in which a plurality of radial inducers is provided on a bottom surface of the cylinder head around the injector.

16 Claims, 5 Drawing Sheets

(52) U.S. Cl.
CPC ...... *F02B 23/0648* (2013.01); *F02B 23/0663* (2013.01); *F02B 23/0669* (2013.01); *F02B 3/06* (2013.01); *Y02T 10/125* (2013.01)

(58) Field of Classification Search
CPC .... F02B 23/0669; F02B 23/0624; F02B 3/06; Y02T 10/125
USPC .............. 123/193.5, 299, 301, 302, 305
See application file for complete search history.

(56) References Cited

U.S. PATENT DOCUMENTS

| | | | |
|---|---|---|---|
| 8,127,735 B2* | 3/2012 | Becker | F01L 3/06 123/188.1 |
| 2006/0081212 A1 | 4/2006 | Hill et al. | |
| 2012/0055439 A1 | 3/2012 | Herdin | |

* cited by examiner

COMBUSTION CHAMBER OF DIRECT INJECTION DIESEL ENGINE HAVING INDUCERS

CROSS-REFERENCE TO RELATED APPLICATION

This Application is a Section 371 National Stage Application of International Application No. PCT/KR2013/009708, filed Oct. 30, 2013 and published, not in English, as WO 2014/069886A1 on May 8, 2014.

FIELD OF THE DISCLOSURE

The present disclosure relates to a combustion chamber of a direct injection diesel engine, and more particularly, to a combustion chamber of a diesel engine, which is intended to improve a mixing rate of fuel and air by providing inducers on a cylinder head and enhancing a squish flow or a swirl flow of air.

BACKGROUND OF THE DISCLOSURE

In general, a gasoline engine, in principle, uniformly mixes air and fuel prior to starting combustion and then ignites fuel using a spark plug to combust fuel, and a diesel engine, in principle, draws only air and compresses the air at a high compression ratio, and then injects fuel at high pressure into the air so as to allow fuel to reach self-ignition. In particular, regarding a general diesel engine, a method of allowing fuel injected from an injector to swirl in a combustion chamber (bowl) formed in a piston to mix fuel and air well and combust fuel is mainly used.

The combustion chamber of the diesel engine needs to be designed to maintain a state in which smoke does not become worse despite less smoke and a delay of injection timing. That is, the combustion chamber of the diesel engine needs to facilitate formation of a gaseous mixture by allowing the injected fuel to collide with a wall surface of the combustion chamber, and to inhibit fuel vapor from flowing to a squish region formed between a piston and a cylinder head while maintaining a swirl flow in the combustion chamber, thereby allowing air to actively flow.

The diesel engine injects fuel into the combustion chamber and mixes the fuel with drawn air at appropriate timing so as to facilitate combustion and exhibit engine performance, and in this case, fuel begins to be injected at the final time of the compression stroke, and fuel is mixed with air by the swirl flow in the combustion chamber and begins to be combusted from the final time of the compression stroke to the initial time of the explosion stroke, and thereafter, unburned smoke is mixed with air at the top of the piston by the squish flow and further combusted, thereby inhibiting smoke from being produced.

Therefore, in order to improve engine performance and reduce exhaust gas, a shape of the combustion chamber of the diesel engine needs to be optimized to optimally mix fuel and air in the combustion chamber.

Figure 1:
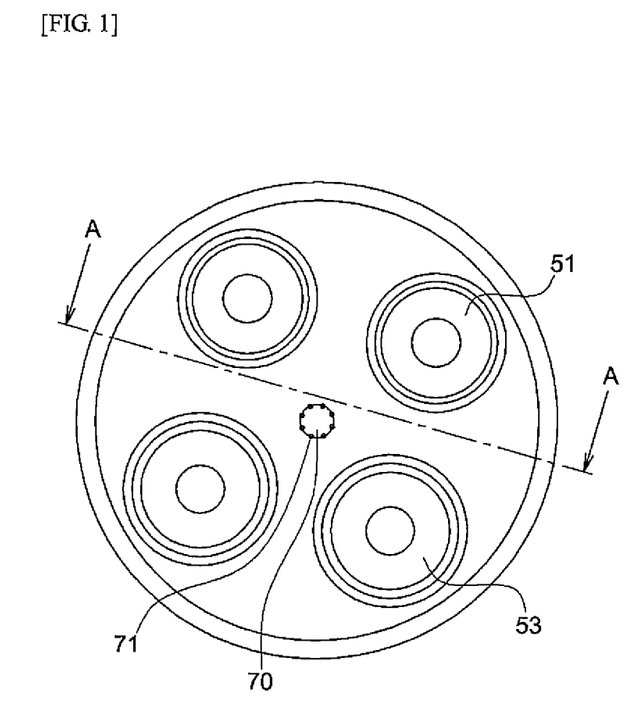
FIG. 1 is a top plan view of a combustion chamber of a direct injection diesel engine according to the related art.
Figure 2:
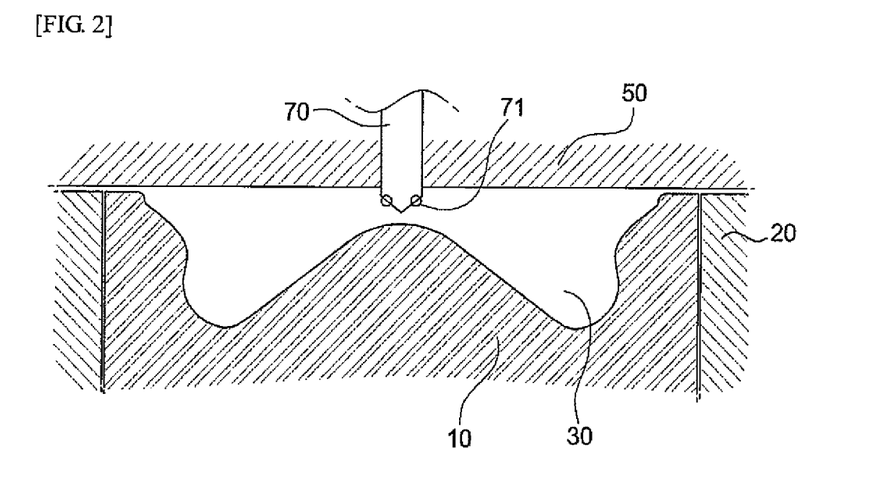
FIG. 2 is a cross-sectional view of the combustion chamber of the direct injection diesel engine according to the related art, which is taken along line A-A.

FIGS. 1 and 2 are a top plan view and a cross-sectional view of a combustion chamber of a diesel engine in the related art, respectively, and a recessed combustion bowl 30, which allows a flow of fuel injected from an injector 70 to be a swirl flow and a squish flow at an upper side of a piston 10, is provided in the combustion chamber of the diesel engine. The piston 10 moves upward and downward while sliding along an inner circumferential surface of a cylinder block 20, and compresses or expands air in the combustion bowl 30, and at the same time, fuel injected from the injector 70 is mixed with the compressed air and then begins to be combusted.

Therefore, when high-pressure fuel is injected from the injector 70 in a state in which air drawn from an intake port is compressed by the upward movement of the piston 10, the fuel injected from the injector 70 induces a squish flow and a swirl flow in the combustion chamber formed in an upper surface of the piston 10, and is mixed with air that forms a turbulent flow.

However, according to the combustion chamber of the diesel engine in the related art, because the squish flow in which a gaseous mixture flows from the bowl to the squish region at an initial time of combustion cannot be concentrated toward an injection hole of the injector, a mixing rate of fuel and air deteriorates, and preservability of the swirl flow and intensity of the turbulent flow in the vicinity of the wall surface of the combustion chamber deteriorate, such that air in the squish region and the squish flow to be combusted are insufficient at the final time of combustion, thereby adversely affecting engine performance and reduction in exhaust gas.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

The present disclosure has been made in an effort to solve the above problem, and an object of the present disclosure is to provide a combustion chamber of a diesel engine, which improves preservability of a swirl flow and intensity of a turbulent flow by inducing a squish flow by which a gaseous mixture flows from a combustion bowl to a squish region at an initial time of combustion, and improves engine performance and reduces exhaust gas by concentrating air toward injection holes of an injector.

In order to achieve the above object, a combustion chamber of a direct injection diesel engine according to the present disclosure includes: a recessed combustion bowl 30 which mixes fuel injected from an injector 70 with air; a cylinder head 50 which has the injector 70 disposed therein and is positioned at an upper side of the combustion bowl 30; a cylinder block 20 which is positioned at a lower side of the cylinder head 50; and a piston 10 which moves upward and downward in the cylinder block 20 and faces the cylinder head 50, in which a plurality of radial inducers 60 is provided on a bottom surface of the cylinder head 50 around the injector 70.

In addition, the inducers 60 may include a plurality of main inducers 61, and a plurality of sub-inducers 62 which is disposed between the main inducers 61 and has a length shorter than a length of any one of the main inducers 61.

In addition, the main inducers 61 and the sub-inducers 62 may be alternatingly disposed to be directed toward a portion between an injection hole 71 and a neighboring injection hole 71 that are provided at an end of the injector 70.

In addition, the cylinder head 50 may include an intake valve 51 and an exhaust valve 53, any one of the main inducers 61 may extend while passing between the intake valve 51 and the exhaust valve 53, and any one of the sub-inducers 62 may be formed to be directed toward the intake valve 51 or the exhaust valve 53.

In addition, the inducers 60 may protrude downward from the bottom surface of the cylinder head 50, and a height of any one of the inducers 60 may be equal to or greater than half of a distance between a top surface of the combustion chamber and an upper end surface of the piston 10, but equal to or less than two times the distance.

In addition, a cross section of any one of the inducers 60 in a vertical direction may be formed in a triangular shape, and gradients of inclined surfaces at both sides of any one of the inducers 60 may be different from each other, such that any one of the inducers 60 is asymmetrical about the vertical axis.

In addition, any one of the inducers 60 may be formed so that a gradient of a surface of to which a swirl flow is directed is steeper than a gradient of a surface opposite to the surface to which the swirl flow is directed.

In addition, the inducers 60 may be disposed in a spiral shape around the injector 70.

In addition, a plurality of injection holes 71 may be provided between any one of the inducers 60 and an adjacent inducer of the inducers 60.

First, the present disclosure as described above may increase a mixing rate of fuel and air using a simple configuration compared to the related art. Second, the mixing rate of fuel and air is increased, thereby improving engine performance and reducing exhaust gas.

DETAILED DESCRIPTION

Hereinafter, a combustion chamber of a diesel engine according to exemplary embodiments of the present disclosure will be described in detail with reference to the accompanying drawings so that those skilled in the art to which the present disclosure pertains may easily carry out the exemplary embodiments. The present disclosure is not limited to the exemplary embodiments described herein, and may be embodied in various different forms.

A part irrelevant to the description will be omitted to clearly describe the present disclosure, and the same or similar constituent elements will be designated by the same reference numerals throughout the specification.

Figure 3:
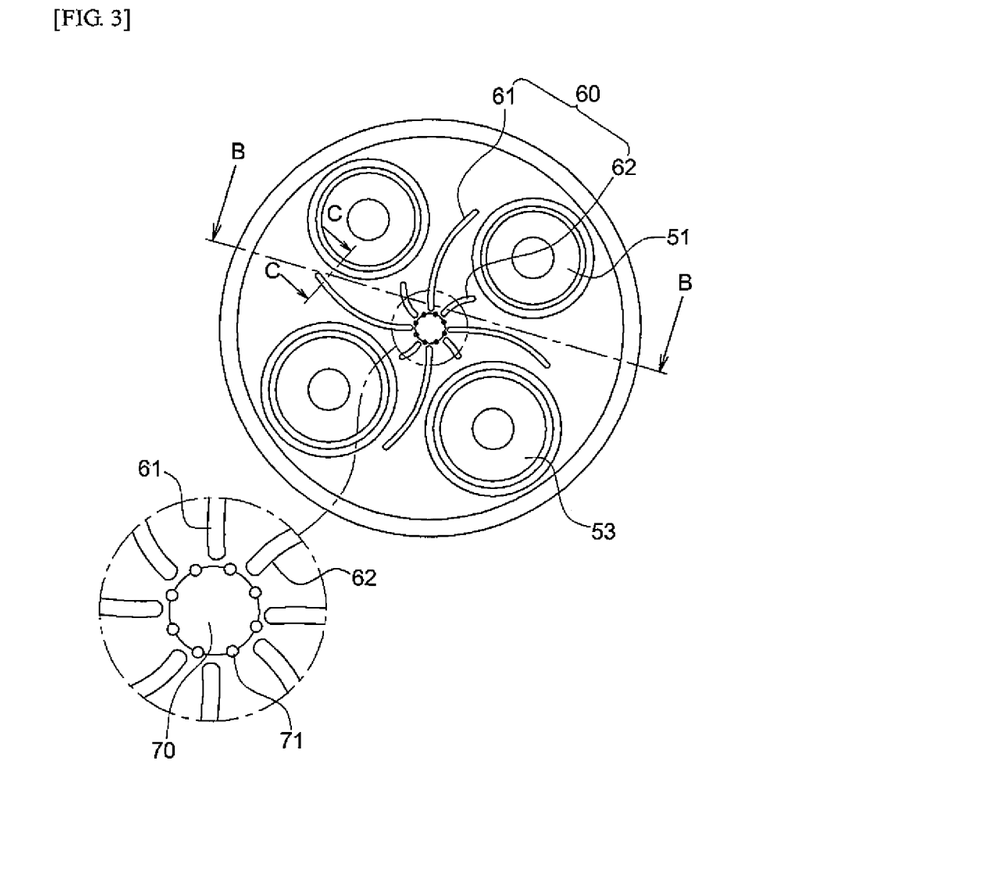
FIG. 3 is a top plan view of a combustion chamber of a direct injection diesel engine according to the present disclosure.
Figure 4:
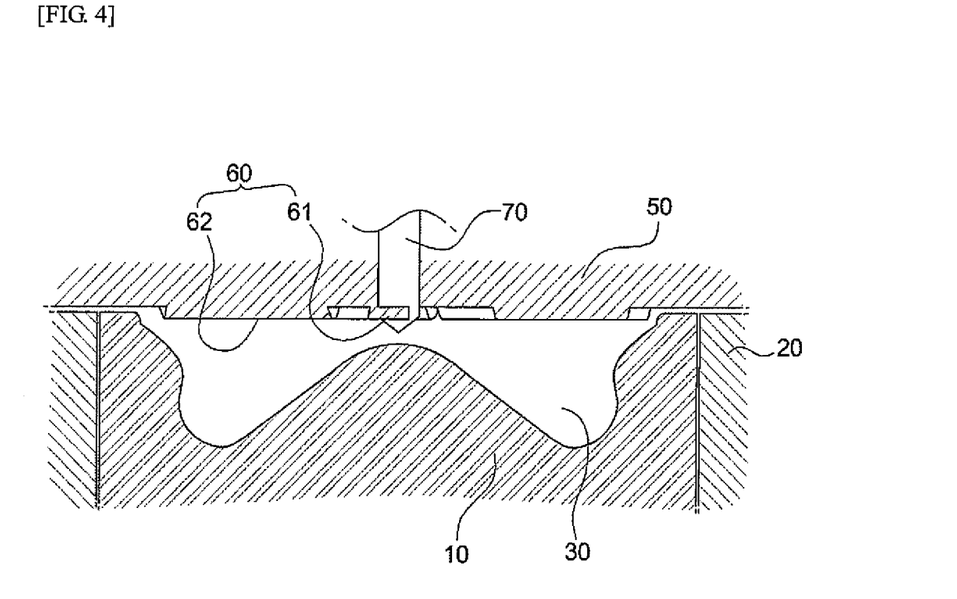
FIG. 4 is a cross-sectional view taken along line B-B of FIG. 2.

As illustrated in FIGS. 3 and 4, a combustion chamber of a diesel engine according to the present disclosure includes a recessed combustion bowl 30 which allows fuel injected from an injector 70 to be mixed with air while inducing a swirl flow or a squish flow, a cylinder head 50 which has the injector 70 and is positioned at an upper side of the combustion bowl 30, a cylinder block 20 which is positioned at a lower side of the cylinder head 50, and a piston 10 which is disposed in the cylinder block 20 and moves upward and downward while facing the cylinder head 50.

The injector 70 is provided in the cylinder head 50 and injects fuel at high pressure toward a center of the combustion bowl 30, and a plurality of injection holes 71 is provided at an end of the injector 70.

The piston 10 compresses and expands air drawn from an intake port (not illustrated) in the combustion bowl 30 while moving upward and downward in the cylinder block 20. In this case, when the air is maximally compressed in the combustion bowl 30 as the piston 10 reaches a top dead point according to the compression stroke of the diesel engine, fuel is injected at high pressure from the injector 70.

In addition, a plurality of radial inducers 60 is provided on a bottom surface of the cylinder head 50 around the injector 70. Any one of the inducers 60 is a guide member for concentrating a squish flow and a swirl flow in the combustion chamber at the injection holes 71 of the injector 70.

That is, as illustrated in FIG. 3, when viewed the cylinder head 50 in plan, the inducers 60 are disposed in a spiral shape around the injector 70, such that the squish flow and the swirl flow are guided toward the injection holes 71 of the injector 70 in a direction in which the inducers 60 guide the squish flow and the swirl flow.

The squish flow refers to a flow that is created at the end (top dead point (TDC)) of the compression process in which an upper end surface of the piston 10 approaches a top surface of the combustion chamber, that is, the bottom surface of the cylinder head 50, and also refers to a flow of air that is rapidly created in a direction toward the center of the combustion bowl 30 of the piston 10 as a space between the upper end surface of the piston 10 and the bottom surface of the cylinder head 50 rapidly becomes small.

That is, as a velocity of the squish flow directed toward the center of the combustion bowl 30 is increased, intensity of a turbulent flow is increased, and a large amount of air is moved from the squish region to a central portion of the combustion chamber where the injector 70 is positioned. As such, by the intense squish flow and the injection of the high-pressure compressed fuel from the injector 70, air and fuel are mixed, and combustion occurs.

In addition, as a velocity of the squish flow is increased, a mixing rate of air and fuel is increased, and as a result, combustion efficiency of the diesel engine is increased. In this case, the velocity of the squish flow is determined by the following equation.

$$\frac{V_{sq}}{S_q} = \frac{D_b}{4z}\left[\left(\frac{B}{D_b}\right)^2 - 1\right]\frac{V_B}{A_c(c+Z)+V_B}$$

$V_{sq}$: Velocity of squish flow
$S_q$: Instantaneous velocity of piston
B: Bore diameter of combustion chamber
$D_b$: Diameter of piston bowl
$V_B$: Volume of piston bowl
C: Distance between upper end surface of piston and top surface of combustion chamber (clearance height)

Z: Distance between top dead point of piston and upper end surface of piston

That is, a point at which a maximum squish flow is created is the vicinity of the top dead point (Z=minimum value), and as a result, if the combustion chamber has the same shape, it is necessary to reduce the distance between the upper end surface of the piston and the top surface of the combustion chamber (the bottom surface of the cylinder head) in order to increase the velocity of the squish flow. However, there is a technical limit in reducing the distance because of an error occurring when processing respective components in the combustion chamber, an error occurring due to a thickness of oil between components, and an error caused by thermal expansion.

As described above, a technology of increasing the velocity of the squish flow is difficult to be implemented, and as a result, the combustion chamber of the diesel engine according to the present disclosure has the plurality of inducers 60 or guiders that are provided on the bottom surface of the cylinder head 50, thereby increasing the velocity of the squish flow and the swirl flow, and increasing the mixing rate of fuel and air by concentrating the squish flow and the swirl flow toward the injection holes 71 of the injector 70.

In addition, the diesel engine uses the swirl flow in order to increase the mixing rate of fuel and air in the combustion chamber and uniformly distribute fuel, which is injected at high pressure, in a space of the combustion chamber.

The swirl flow is produced in a direction in which an air flow rotates from the center of the combustion chamber when air is drawn through the intake port. When a direction of a part of the swirl flow is changed into a direction identical to the direction of the squish flow to increase the velocity of air flowing toward the central portion of the combustion chamber and increase intensity of the turbulent flow, and a supply amount of air is increased, the mixing rate of air and fuel injected from the injector 70 disposed at the center of the combustion chamber may be increased.

As illustrated in FIG. 3, the inducers 60 according to the present disclosure include main inducers 61 which extend while passing between intake valves 51 and exhaust valves 53, and sub-inducers 62 which have a length that is equal to or smaller than half of the length of any one of the main inducers 61 and are formed toward the intake valves 51 and the exhaust valves 53.

When viewed from the bottom surface of the cylinder head 50, the inducers 60 may be disposed in a spiral shape around the injector 70. In some cases, the inducers 60 may be disposed in a straight line shape around the injector 70, or may have one or more bent portions and have a meandering shape.

As illustrated in FIG. 4, according to a cross section of the combustion chamber taken along line B-B, any one of the inducers 60 has a shape that protrudes from the bottom surface of the cylinder head 50, that is, the top surface of the combustion chamber, and a volume of the combustion chamber is reduced by a volume of any one of the protruding inducers 60, such that a compression ratio in the combustion chamber is increased.

In addition, it may be necessary to adjust the compression ratio by adjusting the shape of the combustion bowl 30 in the combustion chamber corresponding to the volume of the combustion chamber which is reduced as the volume of any one of the inducers 60 is increased.

Figure 5:
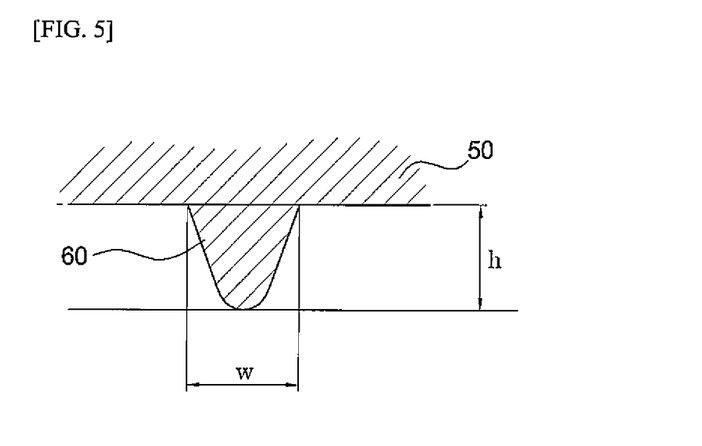
FIG. 5 is a cross-sectional view taken along line C-C of FIG. 2.

FIG. 5 illustrates a cross section taken along line C-C of FIG. 3, in which a height of any one of the main inducers 61 is indicated by h, and a width of any one of the main inducers 61 is indicated by w. The cross-sectional shape of any one of the main inducers 61 may be the same as the cross-sectional shape of any one of the sub-inducers 62. In addition, any one of the main inducers 61 may have the same height h and the same width w as any one of the sub-inducers 62.

In addition, the height h and the width w of any one of the main inducers 61 may be greater than the height and the width of any one of the sub-inducers 62, or in some cases, the height and the width of any one of the sub-inducers 62 may be greater than the height and the width of any one of the main inducers 61.

Where the distance between the top surface of the combustion chamber and the upper end surface of the piston is C (clearance height), the height h of any one of the inducers 60 may be associated with the relationship $0.5*C<h<2*C$.

In addition, the width w of any one of the inducers 60 may be changed according to the swirl flow, and may be asymmetrical about the vertical axis based on a centerline, such that an inclined surface at one side may be more gentle than an inclined surface at the other side. That is, a surface to which the swirl flow is directed may be steeply inclined, and a surface opposite to the surface to which the swirl flow is directed may be gently inclined.

Figure 6:
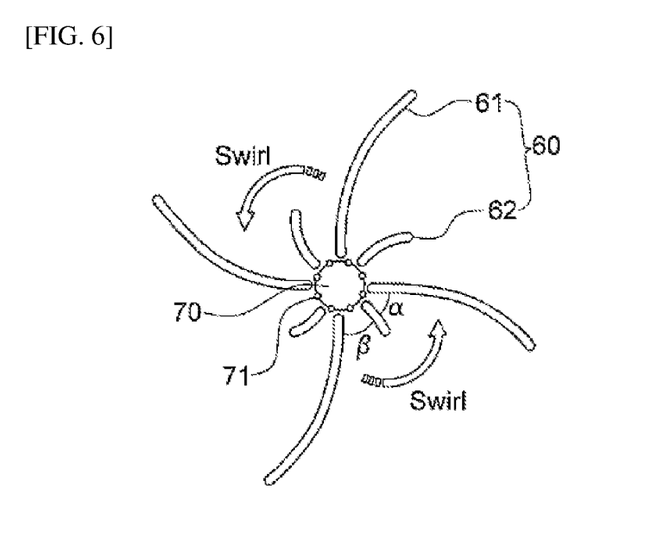
FIG. 6 is an explanatory view illustrating the combustion chamber of the diesel engine according to the present disclosure.

As illustrated in FIG. 6, the injector 70 has the plurality of injection holes 71, and may have eight injection holes as illustrated in FIG. 3. Therefore, one side of any one of the inducers 60 is directed toward a portion between the injection hole 71 and the injection hole 71, such that the four main inducers 61 and the four sub-inducers 62 may be disposed between the injection hole 71 and the injection hole 71 in sequence, respectively.

In addition, the two or more inducers 60 may be disposed between the injection hole 71 and the injection hole 71, and as a result, the number of inducers 60 may be greater than the number of injection holes 71.

Of course, the number of injection holes 71 of the injector 70 may be greater than the number of inducers 60, and in this case, the plurality of injection holes 71 may be disposed between the main inducers 61 and the sub-inducers 62.

Since the number of injection holes 71 according to the present disclosure illustrated in FIG. 6 is 8, an angle between the respective injection holes 71 is 45 degrees, and since an amount of flowing air is increased as the length of any one of the inducers 60 is increased, the inducers 60 may be installed to appropriately extend in accordance with sizes and arrangement of the intake valves 51 and the exhaust valves 53.

In addition, angles ($\alpha$, $\beta$) between the main inducers 61 and the sub-inducers 62 may vary, and lengths, widths, and heights thereof may be variously changed and implemented.

Figure 7:
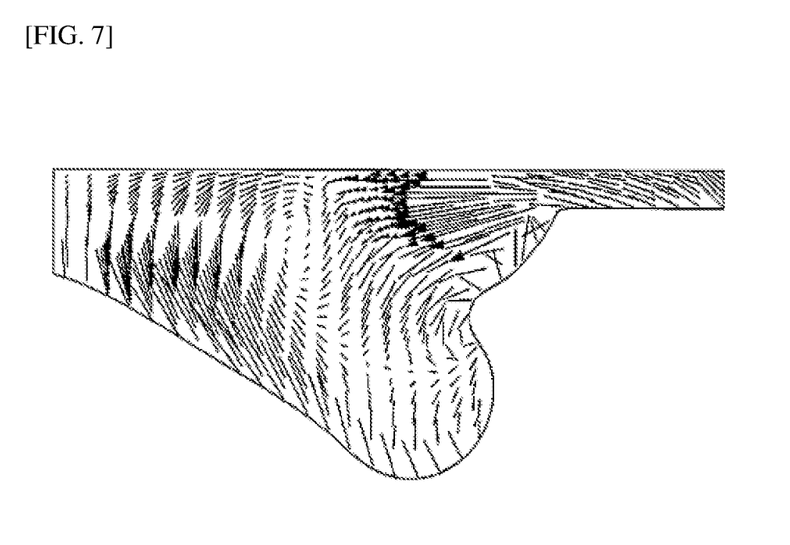
FIGS. 7 and 8 are explanatory views illustrating a state of the combustion chamber at a top dead point of a piston.

FIG. 7 illustrates a flow of air in a state in which the piston 10 has reached the top dead point during a process of compressing the combustion chamber, and it can be seen that an intense squish jet flow is created at the center of the combustion bowl 30 from the squish region in a vertical cross section of the combustion chamber.

Figure 8:
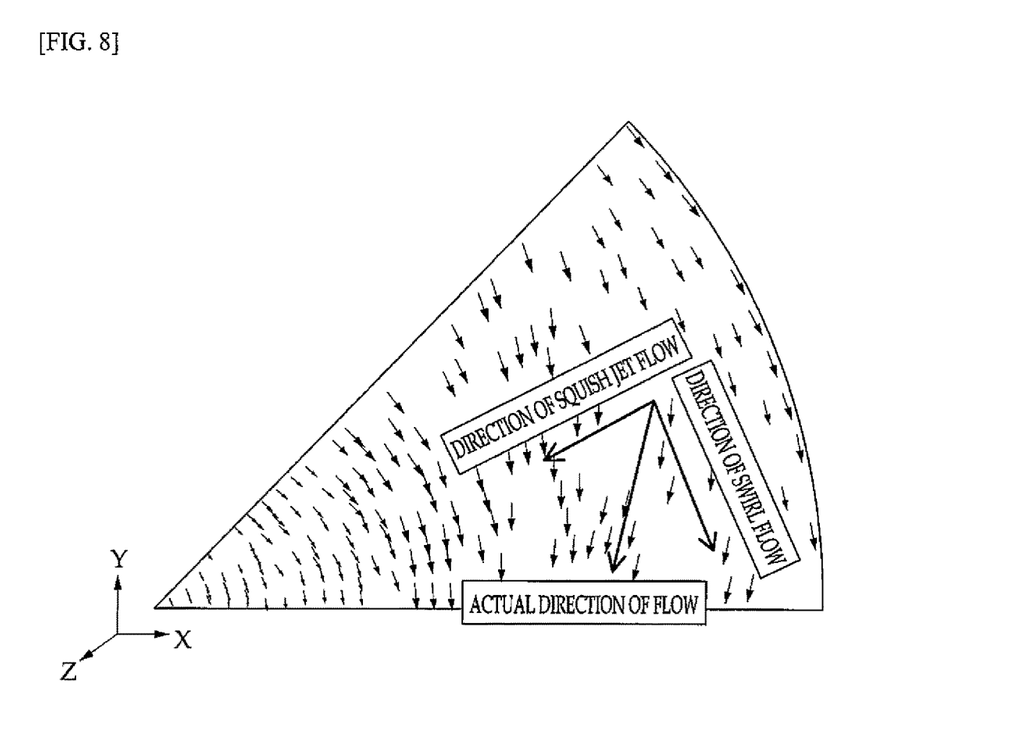

In addition, FIG. 8 illustrates the squish flow and the swirl flow on the upper end surface of the piston 10 during a process of compressing the combustion chamber, and it can be seen that the squish flow and the swirl flow merge together in the combustion chamber. In this case, the inducers 60 are provided, such that a direction of an actual flow created by resultant force of the squish flow and the swirl flow generated at the top dead point of the piston 10 is changed into a direction toward the central portion of the combustion chamber where the injector 70 is positioned, thereby moving a larger amount of air in the squish region.

Figure 9:
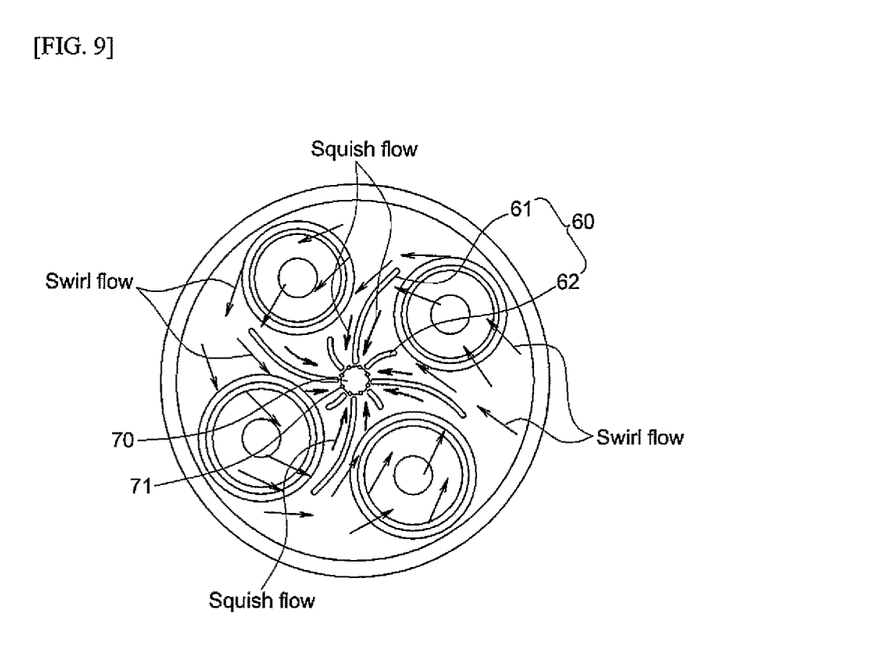
FIG. 9 is an explanatory view illustrating a change in flow in the combustion chamber.

FIG. 9 illustrates in plan a flow in the combustion chamber in a case in which the inducers 60 are provided according to the present disclosure, and it can be seen that the flow in the combustion chamber is changed, such that the flow is rapidly changed, and the velocity of the flow directed toward the central portion is increased, and as a result, intensity of the turbulent flow at the top surface of the cylinder is increased in the cylinder, particularly, at the top dead point of the piston 10, and the mixing rate of fuel and air is increased when the air exiting from the squish region is moved to the vicinity of the injector 70 and fuel is injected in the vicinity of the top dead point.

In addition, a pip (central protruding portion) may be formed at a central portion of the upper surface of the piston 10, and the pip protrudes toward the injector 70 from the upper surface of the piston 10. An upper end surface of the pip is formed to be lower than the upper end surface of the piston 10, such that the combustion chamber disposed between the pip and the bottom surface of the cylinder head 50 has a shallower depth than the combustion chamber formed by other upper end surfaces of the piston 10.

Directions of the plurality of injection holes 71 provided at the end of the injector 70 may be adjusted to inject fuel toward the pip. In addition, the diameters of the injection holes 71 and flow rates of injected fuel may vary, respectively.

The injector 70 has the plurality of injection holes 71, and an angle between a direction in which fuel is injected from the injection holes 71 and a horizontal surface of the cylinder head may be 10 degrees to 30 degrees.

In addition, the injector 70 is configured to be moved upward and downward so as to adjust a flow direction of fuel injected from the injection holes 71, and the injection directions of the injection hole 71 may be variously changed so that the injected fuel effectively collides with the pip and the injected fuel forms the swirl and squish flows.

In addition, a needle valve (not illustrated) is provided in the injector 70, such that a flow path is opened and closed by up and down sliding movements of the needle valve, thereby performing and stopping the operation of injecting fuel from the injection holes 71.

The present disclosure is not limited to the above specific preferred exemplary embodiments, the exemplary embodiments may be variously modified by those skilled in the art to which the present disclosure pertains without departing from the subject matters of the present disclosure claimed in the claims, and the modifications belong to the scope disclosed in the claims.

The combustion chamber of the diesel engine according to the present disclosure may be used for a combustion chamber of a diesel engine which is intended to improve a mixing rate of fuel and air by enhancing a squish flow or a swirl flow of air.

The invention claimed is:

1. A combustion chamber of a diesel engine, which has a recessed combustion bowl to mix fuel injected from an injector with air, the combustion chamber comprising:
   a cylinder head which has the injector disposed therein and is positioned at an upper side of the combustion bowl;
   a cylinder block which is positioned at a lower side of the cylinder head; and
   a piston which moves upward and downward in the cylinder block and faces the cylinder head,
   wherein a plurality of radial inducers is provided on a bottom surface of the cylinder head around the injector, and
   wherein the radial inducers include a plurality of main inducers and a plurality of sub-inducers, each of the plurality of sub-inducers is disposed between two of the main inducers and has a length shorter than a length of a main inducer of the main inducers.

2. The combustion chamber of claim 1, wherein the main inducers and the sub-inducers are alternatingly disposed to be directed toward a portion between an injection hole and a neighboring injection hole that are provided at an end of the injector.

3. The combustion chamber of claim 1, wherein the cylinder head includes an intake valve and an exhaust valve, wherein the main inducers extend while passing between the intake valve and the exhaust valve, and the sub-inducers are formed to be directed toward the intake valve or the exhaust valve.

4. The combustion chamber of claim 1, wherein the radial inducers protrude downward from the bottom surface of the cylinder head, and a height of an inducer of the radial inducers is equal to or greater than half of a distance between a top surface of the combustion chamber and an upper end surface of the piston.

5. The combustion chamber of claim 4, wherein a cross section of an inducer of the radial inducers in a vertical direction is formed in a triangular shape, and gradients of inclined surfaces at both sides of an inducer of the radial inducers are different from each other, such that an inducer of the radial inducers is asymmetrical about the vertical axis.

6. The combustion chamber of claim 5, wherein an inducer of the radial inducers is formed so that a gradient of a surface to which a swirl flow is directed is steeper than a gradient of a surface opposite to the surface to which the swirl flow is directed.

7. The combustion chamber of claim 1, wherein the radial inducers are disposed in a spiral shape around the injector.

8. The combustion chamber of claim 1, wherein each of a plurality of injection holes is provided between two inducers of the radial inducers.

9. A combustion chamber of a diesel engine, which has a recessed combustion bowl to mix fuel injected from an injector with air, the combustion chamber comprising:
   a cylinder head which has the injector disposed therein and is positioned at an upper side of the combustion bowl;
   a cylinder block which is positioned at a lower side of the cylinder head; and
   a piston which moves upward and downward in the cylinder block and faces the cylinder head,
   wherein a plurality of radial inducers protrudes from a bottom surface of the cylinder head around the injector towards the combustion bowl,
   wherein the plurality of radial inducers is formed in a spiral shape,
   wherein at least a part of a squish flow and a part of a swirl flow are guided toward a center of the injector during a process of compressing the combustion chamber and joined to each other by the radial inducers,
   wherein the radial inducers include a plurality of main inducers and a plurality of sub-inducers, and
   wherein each of the sub-inducers is disposed between two of the main inducers and has a length shorter than a length of a main inducer of the main inducers.

10. The combustion chamber of claim 9, wherein a plurality of injection holes is disposed at an end of the injector, and the main inducers and the sub-inducers are alternatingly disposed to be directed toward a portion between an injection hole and a neighboring injection hole among the plurality of injection holes.

11. The combustion chamber of claim 9, wherein the cylinder head includes an intake valve and an exhaust valve, wherein a main inducer of the main inducers extends while passing between the intake valve and the exhaust valve, and wherein a sub-inducer of the sub-inducers is formed to be directed toward the intake valve or the exhaust valve.

12. The combustion chamber of claim 9, wherein an inducer of the radial inducers protrudes downward from the bottom surface of the cylinder head, and a height of an inducer of the radial inducers is equal to or greater than half of a distance between a top surface of the combustion chamber and an upper end surface of the piston.

13. The combustion chamber of claim 12, wherein a cross section of an inducer of the radial inducers in a vertical direction is formed in a triangular shape, and gradients of inclined surfaces at both sides of an inducer of the radial inducers are different from each other, such that an inducer of the radial inducers is asymmetrical about the vertical axis.

14. The combustion chamber of claim 9, wherein a sub-inducer of the sub-inducers, which is disposed between two main inducers of the main inducers that face each other, is disposed to be closer to one of the main inducers than the other that face each other.

15. The combustion chamber of claim 14, wherein the main inducers are uniformly disposed radially around the injector.

16. The combustion chamber of claim 15, wherein an angle formed between a sub-inducer of the sub-inducers and a main inducer of the main inducers, which is disposed at a downstream side of the swirl flow among the main inducers that face each other with a sub-inducer of the sub-inducers disposed therebetween, is smaller than an angle formed between a sub-inducer of the sub-inducers and a main inducer of the main inducers, which is disposed at an upstream side of the swirl flow.

* * * * *